(12) United States Patent
Comiskey (10) Patent No.: US 6,376,828 B1
(45) Date of Patent: Apr. 23, 2002

(54) ILLUMINATION SYSTEM FOR NONEMISSIVE ELECTRONIC DISPLAYS

(75) Inventor: Barrett Comiskey, Cambridge, MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 09/413,934

(22) Filed: Oct. 7, 1999

Related U.S. Application Data (60) Provisional application No. 60/103,384, filed on Oct. 7, 1998.

(51) Int. Cl.[7] .................................................. H01J 3/14
(52) U.S. Cl. ......................................... 250/216; 345/48
(58) Field of Search ........................... 250/216, 227.11, 250/227.2, 227.24, 214 B, 214 AL; 345/7, 8, 9, 22, 23, 24, 25, 47, 48, 49

(56) References Cited

U.S. PATENT DOCUMENTS

| | | | |
|---|---|---|---|
| 2,800,457 A | 7/1957 | Green et al. | 252/316 |
| 3,036,388 A | 5/1962 | Tate | 35/66 |
| 3,384,488 A | 5/1968 | Tulagin et al. | 96/88 |
| 3,406,363 A | 10/1968 | Tate | 335/302 |
| 3,460,248 A | 8/1969 | Tate | 29/607 |
| 3,585,381 A | 6/1971 | Hodson et al. | 250/47 |
| 3,612,758 A | 10/1971 | Evans et al. | 174/5.4 |
| 3,668,116 A | 6/1972 | Ota | 204/299 |
| 3,670,323 A | 6/1972 | Sobel et al. | 340/324 |
| 3,756,693 A | 9/1973 | Ota | 350/160 |
| 3,767,392 A | 10/1973 | Ota | 96/1 |
| 3,772,013 A | 11/1973 | Wells | 96/1.3 |
| 3,792,308 A | 2/1974 | Ota | 315/150 |
| 3,806,893 A | 4/1974 | Ohnishi et al. | 340/173 |
| 3,850,627 A | 11/1974 | Wells et al. | 96/1.3 |
| 3,870,517 A | 3/1975 | Ota et al. | 96/1.5 |
| 3,892,568 A | 7/1975 | Ota | 96/1.3 |
| 3,909,116 A | 9/1975 | Kohashi | 350/267 |
| 3,972,040 A | 7/1976 | Hilsum et al. | 340/324 |
| 4,001,140 A | 1/1977 | Foris et al. | 252/316 |
| 4,041,481 A | 8/1977 | Sato | 340/324 |

(List continued on next page.)

FOREIGN PATENT DOCUMENTS

| | | |
|---|---|---|
| EP | 0 186 710 | 7/1986 |
| EP | 0 268 877 | 6/1988 |
| EP | 0 281 204 | 9/1988 |
| EP | 0 361 420 | 4/1990 |

(List continued on next page.)

OTHER PUBLICATIONS

"Development of Electrophoretic Display Using Microcapsulated Suspension," Nakamura et al., vol. 29, Proceedings of SID'98, International Symposium Anaheim, CA, USA, May 17–22, 1998, pp. 1014–1017.

Sankus, "Electrophoretic Display Cell." Xerox Disclosure Journal 4 (3): 309 (May/Jun., 1979).

Ballinger, "Magnetic Recording Paper Is Erasable." Electronics 46(5): 73–76 (Mar. 1, 1973).

(List continued on next page.)

*Primary Examiner*—Que T. Le
(74) *Attorney, Agent, or Firm*—Testa, Hurwitz & Thibeault, LLP (57) ABSTRACT

An illumination system for selectively illuminating a nonemissive electronic display comprises display elements in communication with at least one light source. The system comprises an nonemissive electronic display comprising a substrate having a first and a second surface, nonemissive display media having electrically responsive optical properties disposed on the first surface of the substrate, and a light transmissive element adjacent the second surface of the substrate. Light transmitted through the light transmissive element illuminates the display media. The invention also provides a tiled display comprising a plurality of substrates which can be selectively illuminated. The display elements can be tiled to create complex, selectively illuminated, three-dimensional display structures.

17 Claims, 4 Drawing Sheets

U.S. PATENT DOCUMENTS

| | | | |
|---|---|---|---|
| 4,045,327 A | 8/1977 | Noma et al. | 204/299 |
| 4,062,009 A | 12/1977 | Raverdy et al. | 340/324 |
| 4,068,927 A | 1/1978 | White | 350/160 |
| 4,071,430 A | 1/1978 | Liebert | 204/299 |
| 4,088,395 A | 5/1978 | Giglia | 350/357 |
| 4,093,534 A | 6/1978 | Carter et al. | 350/355 |
| 4,123,346 A | 10/1978 | Ploix | 204/299 |
| 4,126,528 A | 11/1978 | Chiang | 204/180 |
| 4,126,854 A | 11/1978 | Sheridon | 340/373 |
| 4,143,103 A | 3/1979 | Sheridon | 264/4 |
| 4,143,472 A | 3/1979 | Murata et al. | 35/66 |
| 4,147,932 A | 4/1979 | Lewis | 250/330 |
| 4,149,149 A | 4/1979 | Miki et al. | 340/753 |
| 4,166,800 A | 9/1979 | Foag | 252/316 |
| 4,185,621 A | 1/1980 | Morrow | 128/672 |
| 4,203,106 A | 5/1980 | Dalisa et al. | 340/787 |
| 4,211,668 A | 7/1980 | Tate | 252/316 |
| 4,218,302 A | 8/1980 | Dalisa et al. | 204/299 |
| 4,231,641 | 11/1980 | Randin | 350/357 |
| 4,261,653 A | 4/1981 | Goodrich | 350/362 |
| 4,272,596 A | 6/1981 | Harbour et al. | 430/37 |
| 4,273,672 A | 6/1981 | Vassiliades | 252/316 |
| 4,285,801 A | 8/1981 | Chiang | 204/299 |
| 4,287,337 A | 9/1981 | Guglielmetti et al. | 544/6 |
| 4,298,448 A | 11/1981 | Muller et al. | 204/299 |
| 4,301,407 A | 11/1981 | Koslar | 324/96 |
| 4,305,807 A | 12/1981 | Somlyody | 204/299 |
| 4,311,361 A | 1/1982 | Somlyody | 350/267 |
| 4,314,013 A | 2/1982 | Chang | 430/37 |
| 4,324,456 A | 4/1982 | Dalisa | 350/362 |
| 4,368,952 A | 1/1983 | Murata et al. | 350/362 |
| 4,373,282 A | 2/1983 | Wragg | 40/546 |
| 4,390,403 A | 6/1983 | Batchelder | 204/180 |
| 4,418,346 A | 11/1983 | Batchelder | 340/787 |
| 4,419,383 A | 12/1983 | Lee | 427/47 |
| 4,438,160 A | 3/1984 | Ishikawa et al. | 427/214 |
| 4,450,440 A | 5/1984 | White | 340/753 |
| 4,453,200 A | 6/1984 | Trcka et al. | 362/31 |
| 4,502,934 A | 3/1985 | Gazard et al. | 204/242 |
| 4,522,472 A | 6/1985 | Liebert et al. | 350/362 |
| 4,543,306 A | 9/1985 | Dubois et al. | 429/194 |
| 4,605,284 A | 8/1986 | Fergason | 350/334 |
| 4,620,916 A | 11/1986 | Zwemer et al. | 204/299 |
| 4,643,528 A | 2/1987 | Bell, Jr. | 350/334 |
| 4,648,956 A | 3/1987 | Marshall et al. | 204/299 |
| 4,655,897 A | 4/1987 | DiSanto et al. | 204/299 |
| 4,703,573 A | 11/1987 | Montgomery et al. | 40/455 |
| 4,707,080 A | 11/1987 | Fergason | 350/334 |
| 4,732,830 A | 3/1988 | DiSanto et al. | 430/20 |
| 4,742,345 A | 5/1988 | DiSanto et al. | 340/787 |
| 4,746,917 A | 5/1988 | DiSanto et al. | 340/787 |
| 4,748,366 A | 5/1988 | Taylor | 310/328 |
| 4,772,820 A | 9/1988 | DiSanto et al. | 313/505 |
| 4,794,390 A | 12/1988 | Lippman | 340/756 |
| 4,833,464 A | 5/1989 | DiSanto et al. | 340/793 |
| 4,870,677 A | 9/1989 | DiSanto et al. | 379/96 |
| 4,889,603 A | 12/1989 | DiSanto et al. | 204/180.1 |
| 4,891,245 A | 1/1990 | Micale | 427/213.3 |
| 4,909,959 A | 3/1990 | Lemaire et al. | 252/500 |
| 4,919,521 A | 4/1990 | Tada et al. | 350/362 |
| 4,931,019 A | 6/1990 | Park | 434/409 |
| 4,947,219 A | 8/1990 | Boehm | 357/20 |
| 4,949,081 A | 8/1990 | Keller et al. | 340/765 |
| 5,009,490 A | 4/1991 | Kouno et al. | 350/342 |
| 5,016,002 A | 5/1991 | Levanto | 340/756 |
| 5,017,225 A | 5/1991 | Nakanishi et al. | 106/21 |
| 5,041,824 A | 8/1991 | DiSanto et al. | 340/787 |
| 5,053,763 A | 10/1991 | DiSanto et al. | 340/787 |
| 5,057,363 A | 10/1991 | Nakanishi | 428/321.5 |
| 5,059,694 A | 10/1991 | Delabouglise et al. | 548/518 |
| 5,066,105 A | 11/1991 | Yoshimoto et al. | 359/58 |
| 5,066,559 A | 11/1991 | Elmasry et al. | 430/111 |
| 5,066,946 A | 11/1991 | DiSanto et al. | 340/787 |
| 5,070,326 A | 12/1991 | Yoshimoto et al. | 340/719 |
| 5,077,157 A | 12/1991 | DiSanto et al. | 430/20 |
| 5,082,351 A | 1/1992 | Fergason | 359/51 |
| 5,105,185 A | 4/1992 | Nakanowatari et al. | 340/784 |
| 5,128,785 A | 7/1992 | Yoshimoto et al. | 359/58 |
| 5,132,049 A | 7/1992 | Garreau et al. | 252/500 |
| 5,138,472 A | 8/1992 | Jones et al. | 359/52 |
| 5,149,826 A | 9/1992 | Delabouglise et al. | 548/518 |
| 5,151,032 A | 9/1992 | Igawa | 434/409 |
| 5,167,508 A | 12/1992 | McTaggart | 434/317 |
| 5,174,882 A | 12/1992 | DiSanto et al. | 204/299 |
| 5,177,476 A | 1/1993 | DiSanto et al. | 340/787 |
| 5,185,226 A | 2/1993 | Grosso et al. | 430/47 |
| 5,187,609 A | 2/1993 | DiSanto et al. | 359/296 |
| 5,194,852 A | 3/1993 | More et al. | 340/712 |
| 5,204,424 A | 4/1993 | Roncali et al. | 526/256 |
| 5,216,416 A | 6/1993 | DiSanto et al. | 340/787 |
| 5,223,115 A | 6/1993 | DiSanto et al. | 204/299 |
| 5,223,823 A | 6/1993 | DiSanto et al. | 340/787 |
| 5,247,290 A | 9/1993 | DiSanto et al. | 345/107 |
| 5,250,932 A | 10/1993 | Yoshimoto et al. | 345/206 |
| 5,250,938 A | 10/1993 | DiSanto et al. | 345/107 |
| 5,254,981 A | 10/1993 | DiSanto et al. | 345/107 |
| 5,256,500 A | 10/1993 | Ishimoto | 429/93 |
| 5,262,098 A | 11/1993 | Crowley et al. | 264/8 |
| 5,266,934 A | 11/1993 | Van Almen | 345/50 |
| 5,266,937 A | 11/1993 | DiSanto et al. | 345/107 |
| 5,268,448 A | 12/1993 | Buechner et al. | 528/380 |
| 5,270,843 A | 12/1993 | Wang | 359/52 |
| 5,272,238 A | 12/1993 | Garnier et al. | 528/9 |
| 5,276,438 A | 1/1994 | DiSanto et al. | 345/107 |
| 5,279,511 A | 1/1994 | DiSanto et al. | 445/24 |
| 5,279,694 A | 1/1994 | DiSanto et al. | 156/275.5 |
| 5,293,528 A | 3/1994 | DiSanto et al. | 345/107 |
| 5,296,974 A | 3/1994 | Tada et al. | 359/885 |
| 5,298,833 A | 3/1994 | Hou | 313/483 |
| 5,302,235 A | 4/1994 | DiSanto et al. | 156/643 |
| 5,303,073 A | 4/1994 | Shirota et al. | 359/51 |
| 5,304,439 A | 4/1994 | DiSanto et al. | 430/20 |
| 5,315,312 A | 5/1994 | DiSanto et al. | 345/107 |
| 5,344,594 A | 9/1994 | Sheridon | 264/4.1 |
| 5,359,346 A | 10/1994 | DiSanto et al. | 345/107 |
| 5,360,689 A | 11/1994 | Hou et al. | 430/34 |
| 5,373,115 A | 12/1994 | Manduley et al. | 177/50 |
| 5,380,362 A | 1/1995 | Schubert | 106/493 |
| 5,383,008 A | 1/1995 | Sheridon | 355/256 |
| 5,389,945 A | 2/1995 | Sheridon | 345/85 |
| 5,402,145 A | 3/1995 | DiSanto et al. | 345/107 |
| 5,403,518 A | 4/1995 | Schubert | 252/572 |
| 5,411,398 A | 5/1995 | Nakanishi et al. | 434/409 |
| 5,411,656 A | 5/1995 | Schubert | 204/299 |
| 5,421,926 A | 6/1995 | Yukinobu et al. | 156/83 |
| 5,450,069 A | 9/1995 | DiSanto et al. | 340/825.31 |
| 5,459,776 A | 10/1995 | DiSanto et al. | 379/96 |
| 5,463,492 A | 10/1995 | Check, III | 359/296 |
| 5,467,107 A | 11/1995 | DiSanto et al. | 345/107 |
| 5,484,292 A | 1/1996 | McTaggart | 434/317 |
| 5,485,176 A | 1/1996 | Ohara et al. | 345/173 |
| 5,490,005 A | 2/1996 | Jueliger | 359/72 |
| 5,497,171 A | 3/1996 | Teres et al. | 345/43 |
| 5,498,674 A | 3/1996 | Hou et al. | 525/369 |
| 5,500,635 A | 3/1996 | Mott | 340/323 |
| 5,508,068 A | 4/1996 | Nakano | 428/1 |
| 5,508,720 A | 4/1996 | DiSanto et al. | 345/169 |
| 5,512,162 A | 4/1996 | Sachs et al. | 205/91 |
| 5,517,407 A | 5/1996 | Weiner | 364/419.01 |

| | | | | | | | |
|---|---|---|---|---|---|---|---|
| 5,534,888 A | 7/1996 | Lebby et al. ............... 345/121 | | 5,843,259 A | 12/1998 | Narang et al. ............. 156/151 |
| 5,538,430 A | 7/1996 | Smith et al. ............... 434/178 | | 5,900,858 A | 5/1999 | Richley ..................... 345/107 |
| 5,543,177 A | 8/1996 | Morrison et al. .......... 427/288 | | 5,914,806 A | 6/1999 | Gordon, II et al. ......... 359/296 |
| 5,543,219 A | 8/1996 | Elwakil ................. 428/402.24 | | 5,930,026 A | 7/1999 | Jacobson et al. ........... 359/296 |
| 5,548,282 A | 8/1996 | Escritt et al. .............. 340/825 | | 5,961,804 A | 10/1999 | Jacobson et al. ........... 204/606 |
| 5,552,679 A | 9/1996 | Murasko ................. 315/169.3 | | 5,963,456 A | 10/1999 | Klein et al. ................. 364/496 |
| 5,556,583 A | 9/1996 | Tashiro et al. ............... 264/4.1 | | 5,978,052 A | 11/1999 | Ilcisin et al. ................ 348/797 |
| 5,561,443 A | 10/1996 | DiSanto et al. ............ 345/107 | | 6,144,361 A * | 11/2000 | Gordon, II et al. ......... 345/107 |
| 5,565,885 A | 10/1996 | Tamanoi .................... 345/100 | | | | |
| 5,573,711 A | 11/1996 | Hou et al. .................. 252/572 | | FOREIGN PATENT DOCUMENTS | | |
| 5,575,554 A | 11/1996 | Guritz ........................ 362/103 | EP | 0 390 303 | 10/1990 |
| 5,582,700 A | 12/1996 | Bryning et al. ............ 204/450 | EP | 0 396 937 | 11/1990 |
| 5,597,889 A | 1/1997 | Takimoto et al. .......... 528/353 | EP | 0 404 545 | 12/1990 |
| 5,604,027 A | 2/1997 | Sheridon .................... 428/323 | EP | 0 417 362 | 3/1991 |
| 5,604,070 A | 2/1997 | Rao et al. ................... 430/110 | EP | 0 442 123 | 8/1991 |
| 5,610,455 A | 3/1997 | Allen et al. ................. 307/400 | EP | 0 443 571 | 8/1991 |
| 5,614,340 A | 3/1997 | Bugner et al. ................ 430/41 | EP | 0 240 063 | 1/1992 |
| 5,627,561 A | 5/1997 | Laspina et al. ............. 345/107 | EP | 0 369 878 | 6/1992 |
| 5,635,317 A | 6/1997 | Taniguchi et al. ............. 430/7 | EP | 0 323 656 | 4/1993 |
| 5,638,103 A | 6/1997 | Obata et al. ................ 347/164 | EP | 0 540 281 | 5/1993 |
| 5,639,914 A | 6/1997 | Tomiyama et al. ......... 564/309 | EP | 0 325 013 | 5/1994 |
| 5,643,673 A | 7/1997 | Hou ..................... 428/402.24 | EP | 0 375 005 | 9/1994 |
| 5,650,247 A | 7/1997 | Taniguchi et al. ............. 430/1 | EP | 0 618 715 | 10/1994 |
| 5,650,872 A | 7/1997 | Saxe et al. .................. 359/296 | EP | 0 408 105 | 1/1995 |
| 5,654,367 A | 8/1997 | Takimoto et al. ........... 525/178 | EP | 0 684 579 | 11/1995 |
| 5,663,224 A | 9/1997 | Emmons et al. ............ 524/188 | EP | 0 525 852 | 5/1996 |
| 5,671,994 A | 9/1997 | Tai et al. ...................... 362/31 | EP | 0 721 176 | 11/1996 |
| 5,672,381 A | 9/1997 | Rajan ......................... 427/198 | EP | 0 899 651 | 3/1999 |
| 5,673,148 A | 9/1997 | Morris et al. ............... 359/536 | EP | 0 924 551 | 6/1999 |
| 5,676,884 A | 10/1997 | Tiers et al. .................. 252/582 | GB | 1 465 701 | 3/1977 |
| 5,691,098 A | 11/1997 | Busman et al. ............. 430/158 | GB | 2 044 508 | 10/1980 |
| 5,693,442 A | 12/1997 | Weiss et al. .................. 430/66 | GB | 2 306 229 | 4/1997 |
| 5,694,224 A | 12/1997 | Tai ............................ 358/455 | JP | 1 314 906 | 4/1973 |
| 5,707,081 A | 1/1998 | Luna ........................... 283/45 | JP | 53-73098 | 6/1978 |
| 5,707,738 A | 1/1998 | Hou ........................... 428/402 | JP | 54111368 | 8/1979 |
| 5,707,747 A | 1/1998 | Tomiyama et al. .......... 428/457 | JP | 55096922 | 7/1980 |
| 5,708,525 A | 1/1998 | Sheridon .................... 359/296 | JP | 60189731 | 9/1985 |
| 5,709,976 A | 1/1998 | Mallhotra ................... 430/124 | JP | 62058222 | 3/1987 |
| 5,714,270 A | 2/1998 | Malhotra et al. ......... 428/537.5 | JP | 62231930 | 10/1987 |
| 5,715,511 A | 2/1998 | Aslam et al. ................ 399/320 | JP | 62269124 | 11/1987 |
| 5,715,514 A | 2/1998 | Williams et al. ............ 399/395 | JP | 62299824 | 12/1987 |
| 5,716,550 A | 2/1998 | Gardner et al. ............. 252/500 | JP | 01086116 | 3/1989 |
| 5,717,283 A | 2/1998 | Biegelsen et al. ........... 313/483 | JP | 01086117 | 3/1989 |
| 5,717,514 A | 2/1998 | Sheridon .................... 359/296 | JP | 01086118 | 3/1989 |
| 5,717,515 A | 2/1998 | Sheridon .................... 359/296 | JP | 64-86116 | 3/1989 |
| 5,722,781 A | 3/1998 | Yamaguchi ................... 400/61 | JP | 01142537 | 6/1989 |
| 5,725,935 A | 3/1998 | Rajan ......................... 428/195 | JP | 01177517 | 7/1989 |
| 5,729,632 A | 3/1998 | Tai ............................. 382/237 | JP | 01248182 | 10/1989 |
| 5,731,116 A | 3/1998 | Matsuo et al. ................ 430/56 | JP | 01267525 | 10/1989 |
| 5,737,115 A | 4/1998 | Mackinlay et al. .......... 359/296 | JP | 0223936 | 9/1990 |
| 5,739,801 A | 4/1998 | Sheridon ...................... 345/84 | JP | 02223934 | 9/1990 |
| 5,742,879 A | 4/1998 | Altrieth, III ................. 399/139 | JP | 02223935 | 9/1990 |
| 5,745,094 A | 4/1998 | Gordon, II et al. .......... 345/107 | JP | 02284124 | 11/1990 |
| 5,750,238 A | 5/1998 | Iijima et al. ................. 428/195 | JP | 02284125 | 11/1990 |
| 5,751,268 A | 5/1998 | Sheridon .................... 345/107 | JP | 3118196 | 5/1991 |
| 5,751,433 A | 5/1998 | Narendranath et al. ..... 358/298 | JP | 04 029291 | 1/1992 |
| 5,751,434 A | 5/1998 | Narendranath et al. ..... 358/298 | JP | 5-61421 | 3/1993 |
| 5,752,152 A | 5/1998 | Gasper et al. ............... 399/366 | JP | 05165064 | 6/1993 |
| 5,753,763 A | 5/1998 | Rao et al. .................... 525/276 | JP | 05173194 | 7/1993 |
| 5,754,332 A | 5/1998 | Crowley ..................... 359/296 | JP | 05307197 | 11/1993 |
| 5,759,671 A | 6/1998 | Tanaka et al. ............... 428/166 | JP | 06-089081 | 3/1994 |
| 5,760,761 A | 6/1998 | Sheridon .................... 345/107 | JP | 6-202168 | 7/1994 |
| 5,767,826 A | 6/1998 | Sheridon et al. .............. 345/84 | JP | 08234176 | 9/1996 |
| 5,767,978 A | 6/1998 | Revankar et al. ........... 358/298 | JP | 9-6277 | 1/1997 |
| 5,777,782 A | 7/1998 | Sheridon .................... 359/296 | JP | 9031453 | 4/1997 |
| 5,783,614 A | 7/1998 | Chen et al. .................. 523/205 | JP | 9-185087 | 7/1997 |
| 5,786,785 A | 7/1998 | Brader et al. ................. 349/20 | JP | 9-211499 | 8/1997 |
| 5,808,783 A | 9/1998 | Crowley ..................... 359/296 | JP | 09230391 | 9/1997 |
| 5,825,529 A | 10/1998 | Crowley ..................... 359/296 | JP | 10-48673 | 2/1998 |
| 5,828,432 A | 10/1998 | Shashidhar et al. ......... 349/139 | JP | 10072571 | 3/1998 |
| 5,835,577 A | 11/1998 | Disanto et al. .......... 379/93.19 | JP | 10-149118 | 6/1998 |

| | | |
|---|---|---|
| JP | 10-161161 | 6/1998 |
| JP | 11202804 | 7/1999 |
| WO | WO82/02961 | 9/1982 |
| WO | WO92/17873 | 10/1992 |
| WO | WO 93/18428 | 9/1993 |
| WO | WO94/24236 | 10/1994 |
| WO | WO95/02636 | 1/1995 |
| WO | WO95/05622 | 2/1995 |
| WO | WO95/15363 | 6/1995 |
| WO | WO95/19227 | 7/1995 |
| WO | WO95/27924 | 10/1995 |
| WO | WO95/33085 | 12/1995 |
| WO | WO97/04398 | 2/1997 |
| WO | WO97/04448 | 2/1997 |
| WO | WO97/20274 | 6/1997 |
| WO | WO97/24907 | 7/1997 |
| WO | WO97/33275 | 9/1997 |
| WO | WO97/35298 | 9/1997 |
| WO | WO98/03896 | 1/1998 |
| WO | WO98/19208 | 5/1998 |
| WO | WO98/41898 | 9/1998 |
| WO | WO98/41899 | 9/1998 |
| WO | WO98/58383 | 12/1998 |
| WO | WO99/10767 | 3/1999 |
| WO | WO99/10768 | 3/1999 |
| WO | WO99/12170 | 3/1999 |
| WO | WO99/26419 | 5/1999 |
| WO | WO99/41728 | 8/1999 |
| WO | WO99/41732 | 8/1999 |
| WO | WO99/41787 | 8/1999 |
| WO | WO99/45582 | 9/1999 |

OTHER PUBLICATIONS

Beilin, et al. "2000–Character Electrophoretic Display." SID 86 Digest: 136–139 (1986). Month Unknown.

Bohnke, et al. "Polymer–Based Solid Electrochromic Cell for Matrix–Addressable Display Devices." Journal of the Electrochemical Society 138 (12): 3612–3617 (Dec., 1991).

Kenward, "Displaying a Winning Glow." Technology Review: 69–73 (Jan./Feb., 1999).

Chiang, "Conduction Mechanism of Charge Control Agents Used in Electrophoretic Display Devices." Proceedings of the SID 18 (3 & 4): 275–282 (Third and Fourth Quarters, 1977).

"Field–Effect Transistor With Diphthalocyanine Thin Film." Electronics Letters 24 (11): 674–675 (May 26, 1988).

Chiang, et al., "A High Speed Electrophoretic Matrix Display." SID 80 Digest:114–115 (1980). (Month Unknown).

Croucher, et al., "Electrophoretic Display: Materials as Related to Performance." Photographic Science and Engineering 25 (2): 80–86 (Mar./Apr., 1981).

Dalisa, "Electrophoretic Display Technology." IEEE Transactions on Electron Devices ED–24 (7): 827–834 (Jul., 1977).

Egashira, et al. "A Solid Electrochromic Cell Consisting of Lu–Diphthalocyanine and Lead Fluoride." Proceedings of the SID 28 (3): 227–232 (1987). (Month Unknown).

Fitzhenry, "Optical Effects of Adsorption of Dyes on Pigment Used in Electrophoretic Image Displays." Applied Optics 18 (19): 3332–3337 (Oct. 1, 1979).

Fitzhenry, "Optical Properties of Electrophoretic Image Display." Proceedings of the SID 22 (4): 300–309 (1981). (Month Unknown).

Goodman, "Passive Liquid Displays: Liquid Crystals, Electrophoretics, and Electrochromics." Proceedings of the SID 17 (1): 30–38 (First Quarter, 1976).

Hatano, et al., "Bistable Paper–White Display Device Using Cholesteric Liquid Crystals." SID 96 Digest: 269–272 (1996)Month Unknown.

Hosaka, et al., "Electromagnetic Microrelays: Concepts and Fundamental Characteristics." Sensors and Actuators A40 (1): 41–47 (Jan., 1994).

Jin, et al., "Optically Transparent, Electrically Conductive Composite Medium." Science 255 (5043): 446–448 (Jan. 24, 1992).

Kornfeld, "A Defect–Tolerant Active–Matrix Electrophoretic Display." SID 84 Digest: 142–144 (1984). (Month Unknown).

Lewis, et al., "Gravitational, Inter–Particle and Particle–Electrode Forces in the Electrophoretic Display." Proceeding of the SID 18 (3 & 4): 235–242 (Third and Fourth Quarters, 1977).

Moesner, et al., "Devices for Particle Handling by an AC Electric Field." IEEE: 66–71 (1995) Month Unknown.

Murau, et al., "The Understanding and Elimination of Some Suspension Instabilities in an Electrophoretic Display." Journal of Applied Physics 49 (9): 4820–4829 (Sep., 1978).

Vaz, et al., "Dual Frequency Addressing of Polymer–Dispersed Liquid–Crystal Films." Journal of Applied Physics 65 (12): 5043–5050 (Jun. 15, 1989).

Ota, et al., "Developments in Electrophoretic Displays." Proceedings of the SID 18 (3 & 4): 243–254 (Third and Fourth Quarters, 1977).

Ota, et al. "Electrophoretic Image Display (EPID) Panel." Proceedings of the IEEE: 1–5 (1973). (Month Unknown).

Ziemelis, "Putting it on Plastic." Nature 393: 619–620 (Jun. 18, 1998).

"E Ink Debuts in JC Penney Stores." Boston Herald: 27 (May 3, 1999).

Sheridon, et al., "A Photoconductor–Addressed Electrophoretic Cell for Office Data Display." SID 82 Digest: 94–95 (1982). (Month Unknown).

Shiwa, et al., "Electrophoretic Display Method Using Ionographic Technology." SID 88 Digest: 61–62 (1988). (Month Unknown).

Singer, et al., "An X–Y Addressable Electrophoretic Display." Proceeding of the SID 18 (3 & 4): 255–266 (Third and Fourth Quarters, 1977).

Dobson, "Electronic Book is a Whole Library." The Sunday Times (Feb. 25, 1996).

Vance, "Optical Characteristics of Electrophoretic Displays." Proceeding of the SID 18 (3 & 4): 267–274 (Third and Fourth Quarters, 1977).

Vizard, "Electric Tales: Computer Chips Replace Wood Chips in the Page of $21^{st}$ Century Book." Times Mirror Magazines, Inc., Reprinted from Popular Science Magazine, (1997). (Month Unknown).

Yang, et al., "A New Architecture for Polymer Transistors." Nature 372: 344–346 (Nov. 24, 1994).

Zollinger, "Structure of SImple Di– and Triarylmethine Dyes." In Color Chemistry: Synthesis, Properties and Applications of Organic Dyes and Pigments. 2d ed. V.C.H. Weinham, 73 (1991). (Month Unknown).

Wilmsen, "'Electronic Ink' Sign Debuts at JC Penney." The Boston Globe (Tuesday, May 4, 1999).

Flaherty, "What Did Disappearing Ink Grow Up to Be? Electronic Ink." The New York Times (Thursday, May 6, 1999).

Jacobson, et al., "Surfaces and Displays." Wired (Jan. 1997).

Comiskey, et al., "An Electrophoretic Ink for All–Printed Reflective Electronic Displays." Nature 394: 253–255 (Jul. 1998).

Zurer, "Digital Ink Brings Electronic Books Closer." C&EN (Jul. 20, 1998).

Peterson, "Rethinking Ink." Science News 153: 396–397 (Jun. 20, 1998).

Guernsey, "Beyond Neon: Electronic Ink." The New York Times (Thursday, Jun. 3, 1999).

White, "An Electrophoretic Bar Graph Display." Proceedings of the SID 22 (3): 173–180 (1981). (Month Unknown).

Pansu, et al., "Structures of Thin Layers of Hard Spheres: High Pressure Limit." J. Physique 45: 331–339 (1984). (Month Unknown).

Pieranski, et al., "Thin Colloidal Crystals." Physical Review Letters 50 (12): 900–903 (Mar. 21, 1983).

Van Winkle, et al., "Layering Transitions in Colloidal Crystals as Observed by Diffraction and Direct–Lattic Imaging." Physical Review 34 (1): 562–573 (Jul. 1986).

Bryce, "Conducting Polymers: Seeing Through Synthetic Metals." Nature 335 (6185): 12–13 (Sep. 1, 1988).

Lee, "Fabrication of Magnetic Particles Displays." Proceedings of the S.I.D. 18 (3 & 4): 283–288 (Third and Fourth Quarters 1977).

Saitoh, et al., "A Newly Developed Electrical Twisting Ball Display." Proceedings of the SID 23 (4): 249–253 (1982) (Month Unknown).

Yang, "The Investigation of Image Formation in a Large–Area Solid State X–Ray Receptor With Electrophoretic Display." J. Appl. Phys. 54 (9): 4711–4721 (Sep. 1983).

Sheridon, et al., "The Gyricon—A Twisting Ball Display." Proceeding of the S.I.D. 18 (3 & 4): 289–293 (Third and Fourth Quarters 1977).

Bao, et al., "Soluble and Processable Regioregular Poly(3–hexylthiophene) for Thin Film Field–Effect Transistor Applications With High Mobility." Appl. Phys. Lett. 69 (26): 4108–4110 (Dec. 23, 1996).

Yamaguchi, et al., "Equivalent Circuit of Ion Projection –Driven Electrophoretic Display." IECE Transactions E74 (12): 4152–4156 (Dec. 1991).

Shiffman, et al., "An Electrophoretic Image Display With Internal Nmos Addres Logic and Display Drivers." Proceedings of the SID 25 (2): 105–115 (1984) (Month Unknown).

Pansu, et al., "Thin Colloidal Crystals: A Series of Structural Transitions." J. Physique 44: 531–536 (1983) (Month Unknown).

Ridley, et al., "All–Inorganic Field Effect Transistors Fabricated by Printing." Science 286: 746–748 (Oct. 22, 1999).

* cited by examiner

ILLUMINATION SYSTEM FOR NONEMISSIVE ELECTRONIC DISPLAYS

RELATED APPLICATION

This application claims priority to U.S. Provisional Application Serial No. 60/103,384, filed Oct. 7, 1998, the entire contents of which are incorporated herein by reference.

FIELD OF THE INVENTION

The present invention relates to a system for illuminating nonemissive electronic displays, and more specifically, to a system for frontlighting a microencapsulated electrophoretic display.

BACKGROUND OF THE INVENTION

The recent advent of nonemissive electronic displays has provided for inexpensive, low power, reflective displays. These displays have uses in a variety of applications such as advertising, information dissemination, education, and entertainment. However, because these displays are nonemissive, the effectiveness of these displays is limited to daytime use or to use in lit rooms. An illumination system which selectively illuminates the display media of such a display system is therefore desired.

Traditional displays (such as liquid crystal displays) typically are illuminated using backlighting. In backlit displays, light from a backlighting source passes through the back of the display via a light transmissive element, such as a light pipe, and is perceived by a viewer. This type of illumination can be used with liquid crystal displays because light can effectively pass through the display media. However, the utility of using backlighting with a nonemissive display, such as a microencapsulated electrophoretic display or rotating ball display, is limited because the display media in such a display is effectively opaque, acting as a barrier to light. In addition, various elements used to increase the uniformity of light passing through the light transmissive element, such as diffusers, decrease the amount of light ultimately reaching the viewer.

SUMMARY OF THE INVENTION

The present invention provides an illumination system to selectively illuminate a nonemissive electronic display, and in particular, provides a microencapsulated electrophoretic display in combination with a frontlighting illumination system. The present invention further provides display elements which can be tiled to create complex, selectively illuminated, three-dimensional structures.

In one embodiment of the invention, an illuminated nonemissive electronic display comprises a substrate having a first and a second surface. A microencapsulated electrophoretic display media is adjacent the first surface of the substrate and a light transmissive element is adjacent the second surface of the substrate. Light transmitted through the light transmitting illuminates the display media. In one embodiment of the invention, the light transmissive element is in communication with a light source transmitting light through the light transmissive element. In a further embodiment of the invention, the substrate is flexible. In still a further embodiment of the invention, the display is selectively illuminated through the use of a photodetector coupled to the light source. In this embodiment, the light source is activated when the level of ambient light detected by the photodetector drops below a selected value.

The invention also provides a tiled display comprising a plurality of substrates, each substrate having at least a first and second surface. A display media comprising microencapsulated electrophoretic display elements is adjacent the first surface of each of the substrates. A light transmissive element is adjacent the second surface of at least one substrate, and light transmitted through the light transmitting element is refractively distributed evenly through a face of the light transmissive element to be received by a viewer, thereby illuminating the display media. In one embodiment of the invention, the light source illuminates more than one substrate. In another embodiment of the invention, a plurality of light sources is provided. In a further embodiment of the invention, the light source(s) are coupled to a photodetector and are responsive to changes in ambient light.

The illumination system according to the present invention can be used to selectively illuminate multicharacter displays having a variety of three-dimensional shapes.

BRIEF DESCRIPTION OF THE DRAWINGS

The foregoing and other objects, features, and advantages of the present invention, as well as the invention itself, will be more fully understood from the following description of preferred embodiments when read together with the accompanying drawings, in which:

In FIG. 2A, a single light source is used to illuminate at least one substrate of the tiled display.

In FIG. 2B, a plurality of light sources is provided.

In FIG. 2C, a single light source is provided which is coupled to a plurality of substrates via a plurality of light conduits.

DETAILED DESCRIPTION

Figure 1:
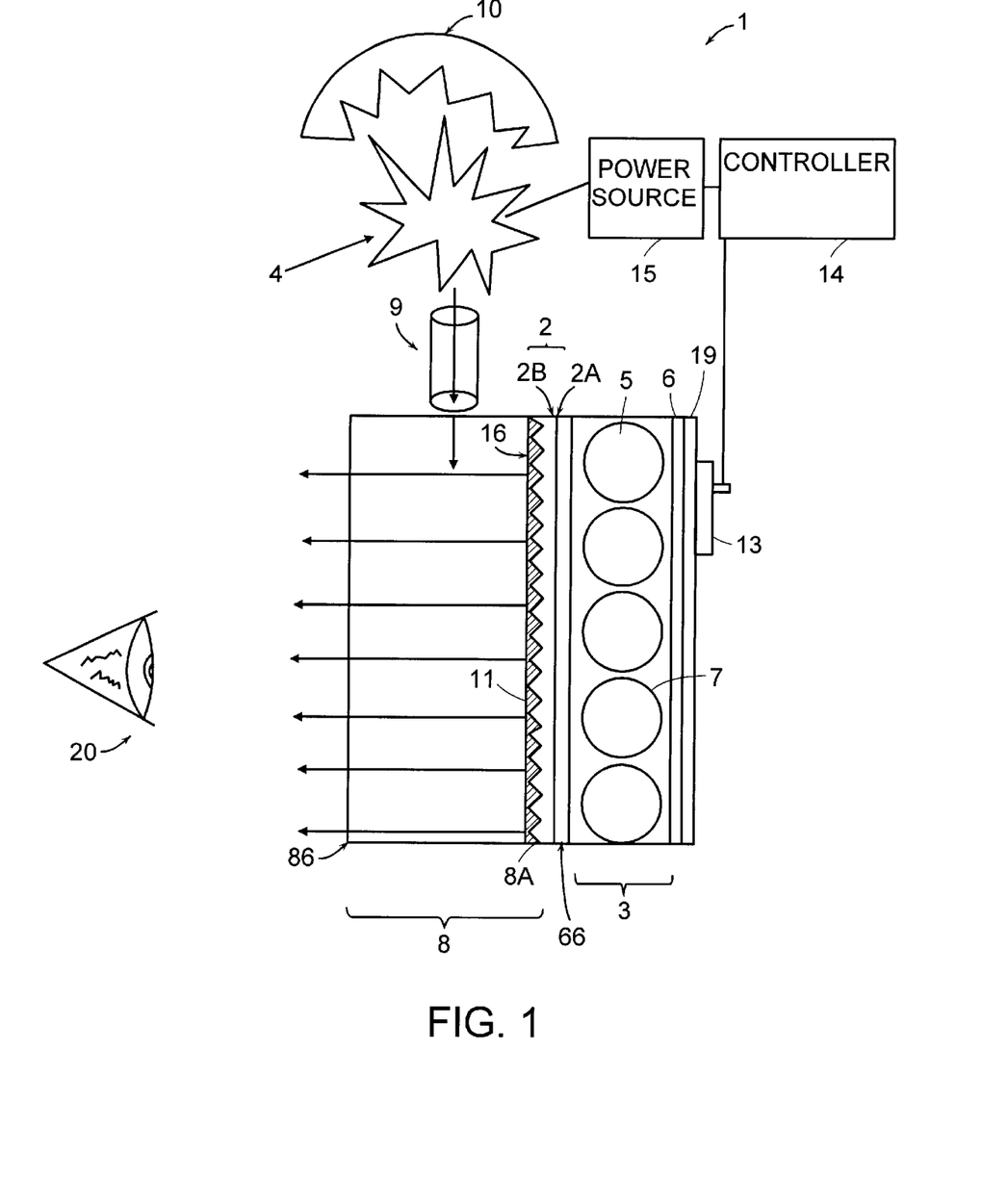
FIG. 1 shows a schematic representation of a side view through an illuminated nonemissive electronic display according to the present invention.

Referring now to FIG. 1, and in brief overview, an illuminated nonemissive electronic display 1 comprises a nonemissive electronic display in combination with an illumination system. The nonemissive electronic display includes a substrate 2 having a first surface 2a and a second surface 2b. A display media 3 is disposed adjacent the first surface 2a and includes nonemissive display elements 5 having electrically-responsive optical properties. The display media 3 is bounded by a front electrode 66 and a back electrode 6. The back electrode 6 is a patterned electrode which selectively alters the optical properties of the display elements 5 in the display media 3, generating displays of images and/or text, (moving or still) in response to voltages selectively applied to different areas of the display media 3. The illumination system comprises at least one light source 4 which communicates with the display media 3 via a light transmissive element 8.

Display Media

Display Elements

The display media 3 according to the present invention includes nonemissive display elements 5 such as particles, particle-containing capsules (e.g., microencapsulated electrophoretic display elements), bichromal spheres, or rotating round balls, dispersed in a binder 7. When the display elements 5 are particle-containing capsules, the capsules may be of any size or shape. In one embodiment of the invention, the capsules are spherical and have diameters in the millimeter or micron range. In a preferred embodiment, the capsule diameters are from about ten to about a few hundred microns. The capsules may be formed by an encapsulation technique and, in one embodiment, include two or more different types of electrophoretically mobile particles.

Particles contained within the capsules may be colored, luminescent, light-absorbing, light scattering, or transparent, and may come in a variety of shapes (e.g., corner cubes). Suitable particle materials include, but are not limited to, neat pigments, dyed (laked) pigments and pigment/polymer composites. In one embodiment, types of particles include scattering pigments, absorbing pigments and luminescent particles. In another embodiment, the particles are transparent. Exemplary particles comprise titania, which may be coated in one or two layers with a metal oxide, such as aluminum oxide or silicon oxide. Exemplary types of luminescent particles comprise zinc sulfide, which may be further encapsulated with an insulative coating to reduce electrical conduction. Light-blocking or absorbing particles, such as dyes or pigments, are also encompassed within the scope of the invention. Types of dyes for use in electrophoretic displays are commonly known in the art.

In one embodiment of the invention, the particles are dispersed in a suspending fluid within the capsules. The suspending fluid may be a high resistivity fluid. The suspending fluid may be a single fluid, or a mixture of two or more fluids. In one embodiment of the invention, the suspending fluid is a halogenated hydrocarbon, such as tetrachloroethylene. The halogenated hydrocarbon may also be a low molecular weight polymer. One such low molecular weight polymer is poly(chlorotrifluoroethylene). The degree of polymerization for this polymer may be from about 2 to about 10.

The suspending fluid may comprise a dye to provide colored display elements 5. Useful dyes are typically soluble in the suspending fluid, and may further be part of a polymeric chain. Dyes may be polymerized by thermal, photochemical, and chemical diffusion processes. Single dyes or mixtures of dyes may also be used.

Different types of particles may be suspended in the suspending fluid. In one embodiment, the suspending fluid comprises a plurality of anisotropic particles and a plurality of second particles. Application of a first electric field causes the anisotropic particles to assume a specific orientation and present an optical property. Application of a second electric field then causes the plurality of second particles to translate, thereby disorienting the anisotropic particles and disturbing the optical property. Alternatively, the orientation of the anisotropic particles may allow easier translation of the plurality of second particles.

A microencapsulated electrophoretic display using particle-containing capsules can be constructed so that the optical state of the display is stable for some length of time. In this embodiment, the particles are suspended in a suspending fluid (either a single fluid or a mixture of fluids) whose density is substantially matched to that of the particles. A stable display media 3 is generated because the particles will not move in the suspending fluid absent an electric field applied via electrodes 66 and 6.

When the display has two states that are stable in this manner, the display is bistable. If more than two states of the display are stable, then the display is multistable. For the purpose of the present invention, the term bistable indicates a display in which any optical state remains fixed once an addressing voltage is removed. However, the definition of a bistable state depends upon the display's application. A slowly decaying optical state can be effectively bistable if the optical state is substantially unchanged over the required viewing time. For example, in a display that is updated every few minutes, a display image that is stable for hours or days is effectively bistable for a particular application. Thus, for purposes of the present invention, the term bistable also indicates a display with an optical state sufficiently long-lived so as to be effectively bistable for a particular application. Alternatively, it is possible to construct encapsulated electrophoretic displays in which the image decays quickly once the addressing voltage to the display is removed (i.e., the display is not bistable or multistable).

Binder

The display media 3 comprises a binder 7 which surrounds display elements 5 and separates the front and back electrodes 66 and 6. Materials for use as binders 7 include, but are not limited to, water-soluble polymers, water-dispersed polymers, oil-soluble polymers, thermoset polymers, thermoplastic polymers, and uv- or radiation-cured polymers. The binder 7 material is compatible with the display elements 5 and front and back electrodes 66 and 6, allowing for facile printing or coating. In another embodiment of the invention, the binder 7 possesses barrier properties for water, oxygen, ultraviolet light, an electrophoretic fluid, or other materials. Further, the binder 7 may contain surfactants and cross-linking agents to improve coating properties and to increase the durability of the display.

In one embodiment of the invention, the binder 7 comprises an electrophoretic fluid directly dispersed or emulsified into the binder 7 (or into a precursor to the binder material) to form what may be called a "polymer-dispersed electrophoretic display." In such displays, the individual electrophoretic phases may be referred to as capsules or microcapsules even though no capsule membrane per se is present. Such polymer-dispersed electrophoretic displays are considered to be subsets of encapsulated electrophoretic displays The successful construction of an encapsulated electrophoretic display media 3 requires the proper interaction of polymeric binders 7, capsule membranes, particles, and suspending fluids which must all be chemically compatible. The capsule membranes may engage in useful surface interactions with the electrophoretic particles, or may act as an inert physical boundary between the fluid and the binder 7. Polymer binders 7 may set as adhesives between capsule membranes and the electrode surfaces. Finally, the degree of stability of the display media 3 can be controlled through appropriate chemical modification of the electrophoretic particles, the suspending fluid, the capsule, and binder 7 materials and through the interactions of these components.

Electrodes

The display media 3 is sandwiched by a front electrode 66 and a back electrode 6. In response to an electric field generated by the front electrode 66 and back electrode 6, the display elements 5 within the display media 3 change their optical states. The back electrode 6 is a patterned electrode which is used to selectively address the display elements 5 within the display media 3, generating displays of images and/or text (moving or still) in response to voltages selectively applied to different areas of the display media 3.

In one embodiment of the invention, as shown in FIG. 1, the back electrode 6 is adjacent to the display media 3. In a further embodiment, the back electrode 6 contacts the display media 3. The back electrode 6 may be disposed on a back electrode substrate 19, or may be printed onto and part of back electrode substrate 19. Similarly, the front electrode 66 may be disposed on the first surface 2a of substrate 2, or may be printed onto, and part of, substrate 2.

When the display media 3, bounded by electrodes 66 and 6, comprises particle-containing capsules (e.g., as in a microencapsulated electrophoretic display), the particles may be oriented or translated by placing an electric field across the capsule. The electric field may include an alternating-current field or a direct-current field.

Particle-containing capsules may be addressed by DC voltages, drawing very little current. In this embodiment, electrodes 66 and 6 can be of relatively high resistivity. The ability to use resistive conductors substantially widens the number and types of materials that can be used. In particular, the use of costly vacuum-sputtered indium tin oxide (ITO) conductors, a standard material in liquid crystal devices, is not required. Aside from the cost savings, the replacement of ITO with other materials can provide benefits in appearance, processing capabilities (printed conductors), flexibility, and durability. Additionally, when printed electrodes are used, these are in contact only with a solid binder and not with a fluid layer (such as a fluid comprising liquid crystals). This means that some conductive materials, which would otherwise dissolve or be degraded by contact with liquid crystals, can be used.

Conductive materials used for the front electrode 66 are at least partially transparent and include indium tin oxide or polyaniline. Electroconductive powders (Zelec ECP electroconductive powders, DuPont Chemical Co., Wilmington, Del.) may also be used to create transparent electrodes. Because conductivity requirements are not as stringent, the electrode layers can be made thinner and more transparent than with traditional displays.

Conductive materials used for back electrode 6 may be either transparent or opaque. Suitable conductive materials for back electrode 6 include opaque metallic inks, such as silver and graphite inks. Organic conductors, such as polymeric conductors and molecular organic conductors may also be used. Suitable materials for polymeric conductors include, but are not limited to, polyaniline and derivatives, polythiophene and derivatives, poly 3,4-ethylenedioxythiophene (PEDOT) and derivatives, polypyrrole and derivatives, and polyphenylenevinylene (PPV) and derivatives. Suitable materials for organic molecular conductors include, but are not limited to, derivatives of naphthalene, pthalocyanine, and pentacene.

Illumination System

According to the present invention, the illuminated non-emissive electronic display 1 comprises at least one light source 4 which communicates with the display media 3 via a light transmissive element 8. Suitable light sources 4 which may used in the present invention include, but are not limited to, cold-cathode fluorescent lamps (CCFL), surface mounting technology (SMT) incandescent lamps, or light emitting diodes (LEDs). In one embodiment of the invention, the light source 4 is side-coupled to the light-transmissive element 8. In a further embodiment of the invention, shown in FIG. 1, a light conduit 9 (e.g., an optical fiber) is provided which channels light into the light-transmissive element 8. In a further embodiment of the invention, a reflector 10 is provide to direct any light back-reflected from the light transmissive element 8 and/or light conduit 9 back into the light transmissive element 8 and/or light conduit 9, to the display media 3, minimizing any loss of light from the light source 4. The reflector 10 comprises a highly light scattering surface which may be patterned (e.g., having sawtoothed ridges, as shown in FIG. 1) to enhance its light scattering effect.

In one embodiment of the invention, the light transmissive element 8 comprises a first face 8a and a second face 8b.

The first face 8a of the light transmissive element 8 is adjacent to the second surface 2b of the substrate 2. Illumination from the light source 4 is directed to the display media 3 through the light transmissive element 8 and is refractively distributed evenly through the second face 8b of the light transmissive element 8 to be received by a viewer 20. As defined herein, the term "adjacent" means in sufficient proximity to the display media 3 for the light transmissive element 8 to illuminate the display media 3. In one embodiment of the invention, the light transmissive element 8 is in contact with the second surface 2b of the substrate 2.

Light entering the light transmissive element 8 has two fates. While some of the light will exit the light transmissive element 8 through second face 8b, the remaining light is captured by total internal reflection within the light transmissive element 8. The relationship between the angle of incidence of light falling on the second face 8b and the angle of refraction (i.e., the angle of the outgoing light) is expressed by Snell's law:

$$n_1 \sin \theta_1 = n_2 \sin \theta_2$$

where $n_1$ is the index of refraction of the light transmissive element 8, $n_2$ is the index of refraction of the external media (e.g., air), $\theta_1$ is the angle of incidence, and $\theta_2$ is the angle of refraction. When the angle of refraction, $\theta_2$, is 90°, $\sin \theta_2$ is equal to 1, and the angle of incidence $\theta_1$ is inverse sin of $n_2/n_1$, defining a critical angle $\theta_c$, corresponding to the change of the refractive index of the material at both sides of the second surface 8b. Total internal reflection occurs whenever the angle of incidence of $\theta_1$ is greater than the critical angle $\theta_c$.

In order to maximize the amount of light which can escape from the light transmissive element 8, surface features, or light scattering centers 11, are provided on the first face 8a of the light transmissive element 8 so that a greater quantity of light falls on second face 8b with an angle of incidence $\theta_1$ which is less than the critical angle $\theta_c$. The light scattering centers 11 may assume a variety of shapes including, but not limited to wedge shapes, surfaces with triangular intrusions, ridges, or micro-roughened structures. Further, the distribution of light transmissive elements can be modified to provide for the substantially uniform refraction of light along the second face 8b of the light transmissive element 8. For example, as shown in FIG. 1, to compensate for the fact that light scattering decreases exponentially with distance from the light source, an increased number of light scattering elements 8 are provided at the end of the light transmissive element 8 farthest from the light source 4. Similarly, the thickness and regularity of features, as well as their distribution, may be modified to enhance the uniformity of light transmitted through second face 8b.

At times it may be desirable at time to bend the light transmissive element 8. The effects of bending on the light output through the second face 8b of the light transmissive element 8 may be compensated for by restricting, or otherwise controlling, the input of the light source 4. To this end, light directors (not shown) may be provided to restrict the input of light to angles that will minimize the amount of total internal reflection. Light directors encompassed within the scope of the present invention, include, but are not limited to, reflectors, refractors, and diffractors.

The light transmissive element 8 may comprise additional elements to enhance the versatility of the illuminated non-emissive electronic display 1. In one embodiment of the invention, shown in FIG. 1, a light polarizing film 16 is provided adjacent first surface 8a to increase the uniformity of light passing through the second face 8b and reaching the viewer 20. In another embodiment of the invention, a red/green/blue absorptive filter (not shown) is provided adjacent the first face 8a or second face 8b of the light transmissive element 8 to alter the wavelength of light passing through the first face 8a or second face 8b thereby creating a colored display.

In another embodiment of the invention, the light transmissive element 8 is made of a flexible material, e.g., a gelatinous, transparent polymer such as PNMA, polyester, polyethylene, polycarbonate, and acrylic, which is capable of bending with the substrate 2 and display media 3. The effect of this is that the reflective display 1 can be used to create complex three-dimensional structures which may be selectively illuminated. In still a further embodiment of the invention, the light transmissive element 8 is a light pipe.

In one embodiment of the invention, nonemissive electronic display 1 is selectively illuminated through the use of a photodetector 13 coupled to the light source 4. In this embodiment, the photodetector 13 detects the level of ambient light and provides information concerning this level to a controller 14 which is in communication with a power source 15. The power source 15, in turn, activates the light source 4. When the level of ambient light drops below a selected value, the controller 14 instructs the power source 15 to activate the light source 4.

In a further embodiment of the invention, additional sensor elements may be provided, such as a motion detector. In this embodiment of the invention, the controller 14 provides instructions to illuminate the display 1 only when someone passes by the display 1. An audio device may additionally be provided which is coupled to the controller 14 to emit an audio signal in response to a cue from the controller 14.

Illuminated Tiled Displays

Figure 2A:
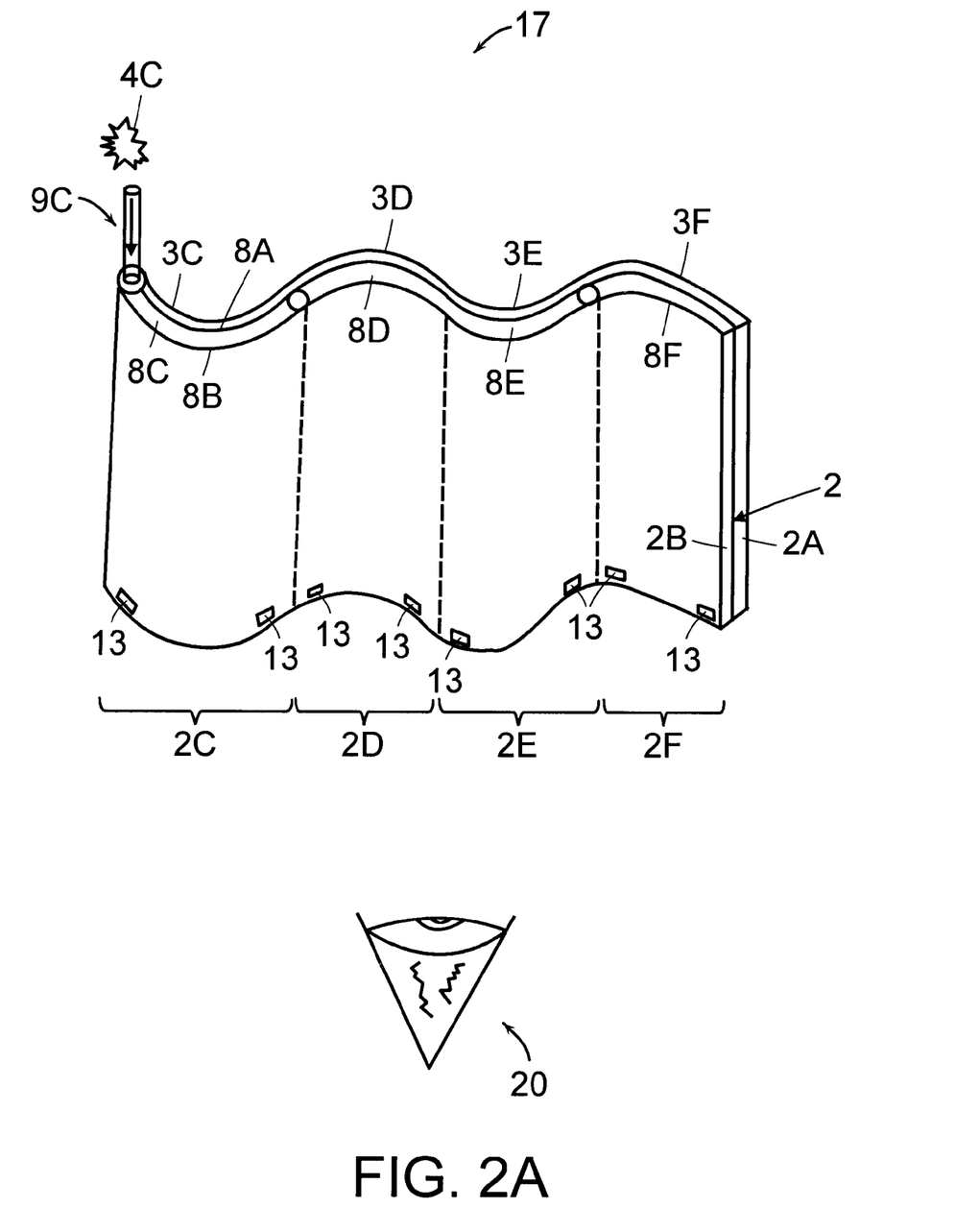
FIGS. 2A–2C show schematic representations of a tiled, illuminated, nonemissive electronic display according to embodiments of the invention.
Figure 2B:
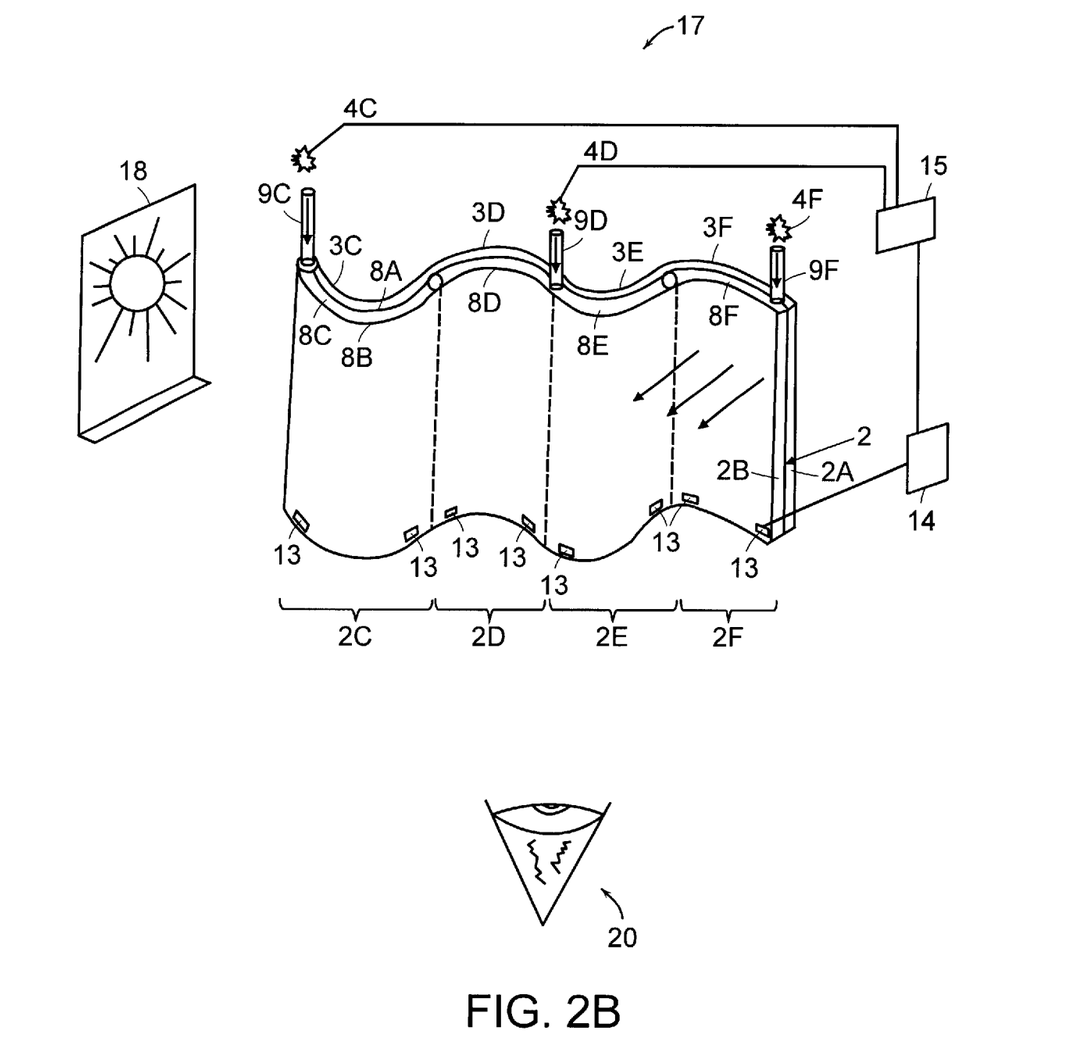
Figure 2C:
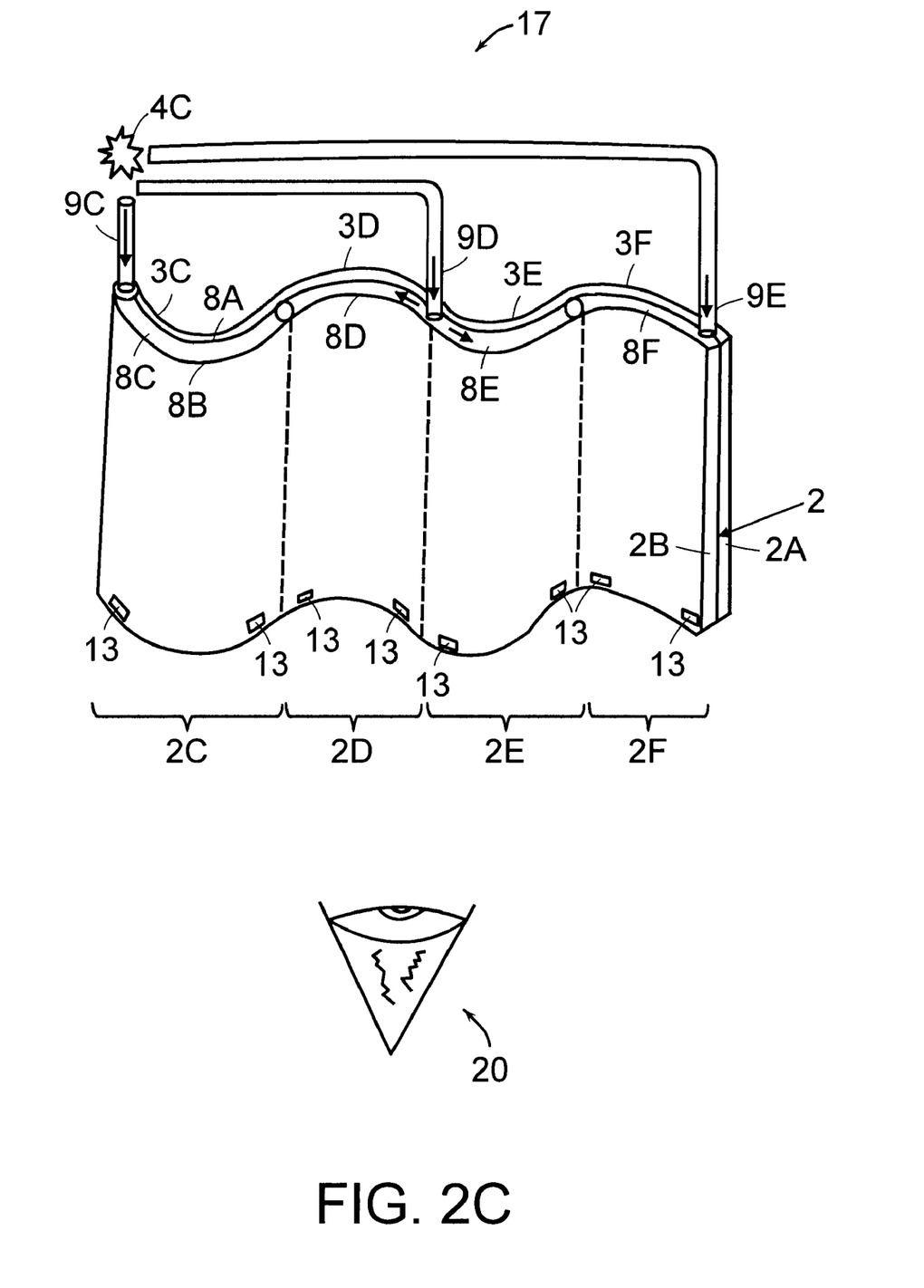

In another embodiment of the invention, as shown in FIGS. 2A–2C, a tiled display 17 is provided which comprises a plurality of substrates 2c, 2d, 2e, and 2f, each substrate 2c, 2d, 2e, and 2f having a first surface 2a and second surface 2b. Display media 3c, 3d, 3e, 3f, each comprising nonemissive display elements 5 (e.g., particles, particle-containing capsules, bichromal spheres and rotating round balls) (not shown), are disposed on the first surface 2a of each of substrates 2c, 2d, 2e, and 2f, respectively. As shown in FIG. 2A, at least one light source 4c is in communication with at least one of the substrates 2c, 2d, 2e, and 2f, via at least one light transmissive element 8c, 8d, 8e, and 8f, and is capable of illuminating at least one of the display media 3c, 3d, 3e, and 3f. In one embodiment of the invention, the substrates 2c, 2d, 2e, and 2f are flexible, allowing the display to assume a three-dimensional shape. In another embodiment of the invention, light transmissive elements 8c, 8d, 8e, and 8f are also flexible. Light source 4c may be coupled to light transmissive elements 8c, 8d, 8e, and 8f via light conduit 9c (e.g., an optical fiber).

In another embodiment of the invention, shown in FIG. 2B, a plurality of light sources 4c, 4d, and 4f may be provided, coupled to a plurality of light transmissive elements 8c, 8d, 8e, and 8f. In this embodiment of the invention, a light source may be used to illuminate a single substrate or multiple substrates. For example, as shown in FIG. 2B, light source 4c is coupled to a single light transmissive element 8c via light conduit 9c and can thereby illuminate substrate 2c. Similarly, light source 4f is coupled to light transmissive element 8f via light conduit 9f and can thereby illuminate substrate 2f. In contrast, light source 4d illuminates two substrates, 2d and 2e, by being side-coupled to two light transmissive elements 8d and 8e via a single light conduit 9d.

In the embodiment of the invention shown in FIG. 2B, at least one light source, 4c, 4d, or 4e, is in communication with at least one photodetector 13 via controller 14 and power source 15. In this embodiment of the invention, individual substrates 2c, 2d, 2e, and 2f and display media 3c, 3d, 3e, and 3f of the tiled display 17 are selectively illuminated in response to signals from the controller 14 which instruct power source 15 to activate any, or all of, light source(s) 4c, 4d, and 4f, when light drops below a selected value. For example, in the embodiment of the invention shown in FIG. 2B, a curved tiled display 17 which is by a window 18 comprises at least one photodetector 13 on each substrate 2c, 2d, 2e, and 2f. As ambient light from the window 18 decreases, the substrate which is farthest from the window 18, i.e., substrate 2f, is illuminated first as light detected by the photodetector 13 on substrate 2f falls below the selected value, causing light source 4f to be activated. As ambient light decreases throughout the room, light sources 4b and 4a become activated, illuminating adjacent substrates 2e, 2d, and 2c.

In still another embodiment of the invention, shown in FIG. 2C, a single light source 4c may be provided coupled to a plurality of light transmissive elements 8c, 8d, 8e, and 8f by means of connecting light conduits 9c, 9d, and 9e (e.g., arrays of optical fibers).

The tiled display 17 according to the present invention provides a means to form a multicharacter display in a variety of three-dimensional shapes, including, but not limited to cylinders, waves, cubes, and curved sections. By selectively altering the optical properties of the display media 3 on each of the substrates 2, a static display can be used to create the impression of motion. In a one embodiment of the invention, through the use of different sensor elements, images may be made to appear to move in response to viewer's behavior.

Changes in the optical properties of multiple substrates 2 may be coordinated, for example using a plurality of transducers (not shown), each transducer in electrical communication with a different substrate 2. Transducers may be connected to each other to create a multi-level transducer path which changes the state of the tiled display 17. The plurality of substrates can create a large area, multicharacter display. By seamlessly positioning individual substrates 2, the distinctions between individual substrates 2 can be made to disappear, creating the effect of a single large area display substrate 2.

In a further embodiment of the invention, the individual substrates 2 of the illuminated tiled display 17 are connected by connecting elements (not shown). For example, a tiled display system 17 may include substrates 2 having a plurality of pixels, each pixel having its own lead line to controller 14. Each lead line may be a discrete or packaged transistor line. In this embodiment, one surface of the substrate 2 comprises a grid of electrodes, 6, each electrode connected through a via to the output of a control chip. Thus, for an N=N grid, N2+1 control lines are needed. An additional line is used to connect the control lines to the electrode 6.

A matrix display using 2N+1 control lines can be built with a plurality of tiled displays 17 using a variety of techniques. In one embodiment, an array of varistors, metal-insulator-metal, or discrete diodes are used for individually addressing each pixel. In the case of diodes, discrete surface-mount zener diodes are useful.

In one embodiment, the substrates 2/display media 3/light emissive elements 8 are connected to each other using cables. The substrates 2/display media 3/light transmissive elements 8 can be mounted to a wall, lightweight metal grid, or any other surface, using nuts soldered onto the back of the substrates 2, or by any other means known in the art of fastening substrates 2. In one embodiment of the invention, a frame may be provided to enclose the display, and standard wall fasteners may be attached to the back of the frame.

The controller 14 includes a microprocessor or other suitable drive circuitry. The controller 14 transmits information to the tile displays 17 to update the display using any convenient form of electromagnetic radiation. In some embodiments, the controller 14 also receives information from the display (e.g., from photodetector 13, motion sensors, and other sensors disposed on substrates 2). Data for the tiled display 17 may be stored in a memory element of the controller 14 or may be received in the form of electromagnetic signals using a receiver (not shown). The receiver, for example, can include an antenna and a passive rectifier in communication with the antenna, as described above.

In one embodiment of the invention the power source 15 connects to a single substrate (e.g., 2c, 2d, 2e, or 2f) and controls the entire display 17. In this embodiment, the power source 15 can consist of a battery, a power supply, a paging receiver, and a microprocessor to control the entire system. The tiled display 17 can be powered using commercially available integrated AC to DC converters. In another embodiment of the invention, each substrate 2 may have its own power source 15 (e.g., a high voltage supply). Common inverter chips may be used in this embodiment.

One method of controlling the entire tiled display 17 is to have a separate controller 14 positioned on each substrate 2. In this embodiment, the controller 14 tells one substrate 2 to which it is connected that it is at a certain coordinate location, e.g., 0,0. Due to the asymmetrical connector layout, the substrate 2 can determine to which edge the controller 14 is connected. That individual substrate 2 then communicates with its neighbors, increasing or decreasing the coordinate location appropriately. Through this protocol, each substrate 2 can determine a unique identification code that specifies its location on the tiled display 17. The controller 14 can then send data out on a common bus, and each substrate 2's controller 14 can receive data needed to update the display on the substrate 2. When the appropriate data appears on the bus, the controller 14 shifts this data out to display drivers (not shown). The entire tiled display 17 is given a write pulse and the entire tiled display 17 is updated. The tiled display 17 described above may be successfully driven with a voltage as low as 3 volts.

In one embodiment, high voltage CMOS display drive circuitry, such as HV57708PG manufactured by Supertex Corporation (Sunnyvale, Calif.) can be used to drive the tiled display 17. HV57708PG is an 80 pin plastic gull wing surface mount chip that has 64 outputs. Each output can sink 15 mA. Four of these chips can control a single substrate 2. Other chips may find utility in the context of the present invention, such as the Sharp LH1538 which is an 80V 128 line Tape-Automated-Bonded (TAB) chip.

While the above-described illumination systems can be used with a variety of nonemissive displays, these systems are particularly suited for use with microencapsulated electrophoretic displays. Electrophoretic displays have been the subject of intense research and development for a number of years. Electrophoretic displays have attributes of good brightness and contrast, wide viewing angles, state bistability, and low power consumption when compared with other nonemissive displays. Encapsulated electrophoretic displays typically do not suffer from the clustering and settling failure mode of traditional electrophoretic devices and provides further advantages, such as the ability to print or coat the display media 3 on a wide variety of flexible and rigid substrates 2. Use of the word "printing" is intended to include all forms of printing and coating, including, but without limitation: premetered coatings such as patch die coating, slot or extrusion coating, slide or cascade coating, and curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; and other similar techniques. Thus, the resulting display can be flexible. Further, because the display media 3 can be printed, the display itself can be made inexpensively.

In combination with the above-described illumination systems, microencapsulated electrophoretic displays according to the present invention are used to create multicharacter displays that can be conformed to a variety of shapes. Such displays are long-lived, consume little power, and maintain their effectiveness through the use of selective illumination provided by the illumination system.

While the invention has been particularly shown and described with reference to specific preferred embodiments, it should be understood by those skilled in the art that various changes in form and detail may be made therein without departing from the spirit and scope of the invention as defined by the amended claims.

What is claimed is:

1. A reflective nonemissive electronic display, comprising:
    a flexible substrate having a first surface and a second surface;
    a flexible microencapsulated electrophoretic nonemissive display media adjacent the first surface of the flexible substrate; and
    a flexible light transmissive element adjacent the second surface of the flexible substrate, wherein light transmitted through the light transmissive element illuminates the display media.

2. The reflective display of claim 1, wherein the light transmissive element is a light pipe.

3. The reflective display of claim 1, further comprising a light source in communication with the light transmissive element and wherein the light source transmits light through the light transmissive element.

4. The reflective display of claim 3, wherein the light source is selected from the group consisting of a cold cathode fluorescent lamp, an SMT incandescent lamp, and a light emitting diode.

5. The reflective display of claim 1, wherein the light transmissive element comprises a first face and a second face, the second face comprising a plurality of surface features.

6. The reflective display of claim 5, wherein the plurality of surface features are selected from the group consisting of wedge shapes, surfaces with triangular intrusions, ridges, or micro-roughened structures.

7. The reflective display of claim 3, wherein the light source is coupled to a photodetector.

8. The reflective display of claim 3, wherein the light source is activated when the level ambient light drops below a selected value.

9. A tiled display, comprising:
    a plurality of flexible substrates, each substrate having at least a first and a second surface;

a display media adjacent the first surface of each of the flexible substrates; and a flexible light transmissive element adjacent the second surface of at least one substrate, wherein light transmitted through the light transmissive element illuminates the display media.

10. The tiled display of claim 9, wherein the plurality of substrates forms a multicharacter display.

11. The tiled display of claim 9, comprising a plurality of light sources.

12. The tiled display of claim 9, further comprising a light source in communication with the light transmissive element and wherein the light source transmits light through the light transmissive element.

13. The tiled display of claim 12, wherein the light source is selected from the group consisting of a cold cathode fluorescent lamp, an SMT incandescent lamp, and a light emitting diode.

14. The tiled display of claim 9, wherein the light transmissive element is a light pipe.

15. The tiled display of claim 12, wherein a single light source illuminates at least two substrates.

16. The tiled display of claim 12, wherein the light source is coupled to a photodetector.

17. The tiled display of claim 12, wherein the light source is activated when the level of ambient light drops below a selected value.

* * * * *